United States Patent [19]

Jetzinger

[11] Patent Number: 4,996,828
[45] Date of Patent: Mar. 5, 1991

[54] MACHINE FOR CUTTING VEGETABLE MATERIAL, WITH A ROTATABLE TOOL CARRIER FOR CUTTING TOOLS

[76] Inventor: Franz Jetzinger, Schindau 31, A-3364 Neuhofen, Austria

[21] Appl. No.: 510,533

[22] Filed: Apr. 18, 1990

[30] Foreign Application Priority Data

Apr. 28, 1989 [AT] Austria ............................. 1026/89

[51] Int. Cl.$^5$ .................... A01D 34/73; A01D 55/00
[52] U.S. Cl. .................................... 56/12.7; 56/295
[58] Field of Search ............ 56/12.7, 255, 256, 295, 56/DIG. 17, DIG. 20

[56] References Cited

U.S. PATENT DOCUMENTS

| | | | |
|---|---|---|---|
| 2,886,117 | 5/1959 | Benson | 56/12.7 X |
| 3,918,241 | 11/1975 | Stillions | 56/295 X |
| 4,229,933 | 10/1980 | Bernard | 56/295 |

FOREIGN PATENT DOCUMENTS 2448130 10/1974 Fed. Rep. of Germany .
3245617 12/1982 Fed. Rep. of Germany .

Primary Examiner—Ramon S. Britts
Assistant Examiner—David J. Bagnell
Attorney, Agent, or Firm—Kurt Kelman

[57] ABSTRACT

A machine for cutting vegetable material, such as a mowing or chopping machine, comprises at least one rotatable tool carrier and tools pivotally mounted on said tool carrier by pins which are parallel to the axis of rotation of the tool carrier. In order to provide a machine which has a robust structure and facilitates the mounting and removal of the tools, each pin carries at least one tool and at opposite ends is movably mounted in two slots, which extend radially with respect to the axis of the rotation of the tool carrier and are formed either in two opposite disks, which constitute the tool carrier, or in lugs, which are secured to and radially protrude from the body of the tool carrier. Each slot has a radially outer portion provided on the outside with a cover for preventing an axial displacement of the associated pin.

13 Claims, 3 Drawing Sheets

MACHINE FOR CUTTING VEGETABLE MATERIAL, WITH A ROTATABLE TOOL CARRIER FOR CUTTING TOOLS

BACKGROUND OF THE INVENTION

1. Field of the Invention

This invention relates to a machine for cutting vegetable material, such as a mowing or chopping machine, which machine comprises at least one rotatable tool carrier and tools, which are pivotally mounted on said tool carrier by means of pins which are parallel to the axis of rotation of the tool carrier.

2. Description of the Prior Art

Because the tools are pivoted, they can yield to a hard object, such as a stone, on which they impinge, and severe damage to the tools is thus prevented. In the known machines the tools are pivoted on pins which are firmly screwed into the tool carrier so that for a replacement of tools the pins must be loosened and subsequently tightened by means of a wrench or another suitable tool and that operation requires a substantial amount of work, particularly because the rough usage in agriculture may often result in a clamping and soiling of the pins. The tools used in such machines usually consist of knives of various types. But the tool carrier may also be provided with air vanes, which may constitute cutters, if desired, and such tool carrier might precede a second tool carrier, which is provided with knives. In that case any crop material lying on the ground may be sucked up and precut by the preceding tool carrier.

Published German Patent Application 24 48 130 discloses a cutting mechanism comprising a knife carrier, which consists of two thin disks, one of which is provided with fixedly mounted pins for fixing the knives. But in that mechanism the two disks must be forced apart by hand when the knives are to be fitted on the pins. The disks are subsequently released to permit the pins to snap into holes formed in the other disk. That operation can be performed without a need for a tool but the tool carrier must consist of very thin, flexible disks and the knife blades must be very thin too if said assembling operation is to be permitted. It will be understood that such a design cannot be adopted for heavy-duty mowing and chopping machines such as are usually employed in agriculture.

Published German Patent Application 32 45 617 discloses a mowing apparatus in which knives are pivoted on pins which are retained by spring force in respective seats formed in the tool carrier. For a detaching or replacement of a knife it will be necessary to pull a leaf spring from associated retaining means or the pin must axially be displaced against the force of a coil spring to such an extent that the knife is released. The design which is required for that purpose is relatively complicated and expensive and has the further disadvantage that only a single knife rather than two or more knives can be pivoted to each pin because the spring excursion would be excessively large otherwise.

Summary of the Invention

For this reason it is an object of the invention to eliminate said disadvantages and to provide a machine which serves to cut vegetable material and is of the kind described first hereinbefore and in which the tools can be detached and mounted in a simple manner without the aid of an implement. Besides, the machine should constitute a robust structure and should be designed substantially to avoid hard impacts affecting the tool carrier and the associated shaft.

That object is accomplished in accordance with the invention in that each pin carries at least one tool and at opposite ends is movably mounted in two slots, which extend radially with respect to the axis of rotation of the tool carrier and are formed either in two mutually opposite disks, which constitute the tool carrier, or in lugs, which are secured to and radially protrude from the body of the tool carrier, and each slot has a radially outer portion, which is provided on the outside with a cover for preventing an axial displacement of the associated pin.

It will be understood that the pins are displaceably mounted in the slots and under the centrifugal force acting on the tools will tend to assume a position at the radially outer ends of the slots, which are covered on the outside adjacent to that radially outer ends so that the pins cannot axially be displaced from the slots at said outer ends. When it is desired to release the pins while the tool carrier is stationary, it will be sufficient to displace the pins and the tools toward the radially inner ends of the slots, which are not covered adjacent to said inner ends so that the pins can be pushed out of the slots at said inner end. As a result, the tools possibly consisting of knives, flails or air vanes can be removed and inserted in a simple manner without the aid of an implement. The design is simple and robust because it is sufficient to provide suitable slots and covers for them.

Within the scope of the invention the disks or lugs may be superimposed and the slots in the bottom disk or in the bottom lug may be covered on the bottom with a cover which leaves at the radially inner end of the slot an opening which is smaller than the cross-section of the pin. In that case the pin will not fall out of the slot at its radially inner end when the machine is stationary and the tool has inadvertently been pushed inwardly.

On the other hand, in a machine in which the tool carrier is rotatable on a horizontal axis, a spring will be associated with each pair of slots and will extend between the disks or lugs adjacent to the radially inner ends of the associated slots and can be forced radially inwardly to clear said slots. Owing to said springs, each pin can be moved only by an arbitrarily applied external force to the radially inner end of the slots, where the pin might be laterally displaced out of the slots.

Within the scope of the invention each slot may be formed on each side of its radially outer end portion with oblique side faces defining an approximately cardioid opening. In case of a relatively strong impact applied to a tool during the operation of the machine, the pin will be able to roll on one or the other of said oblique side faces so that the impact will be damped and a much smaller force will be transmitted to the tool carrier.

A stronger damping of an impact can be achieved and the transmission of force due to an impact to the remaining parts of the machine may further be reduced if the two lugs which are associated with each tool are connected to form a unit, which is pivoted to the tool carrier on an axis which is approximately parallel to its axis of rotation and with a radial play relative to the axis of rotation of the tool carrier and optionally with a circumferential play. In that case each tool will be connected to the tool carrier by a link so that the transmission of the force which is due to an impact will be further damped.

DETAILED DESCRIPTION OF THE PREFERRED EMBODIMENT

Figure 1:
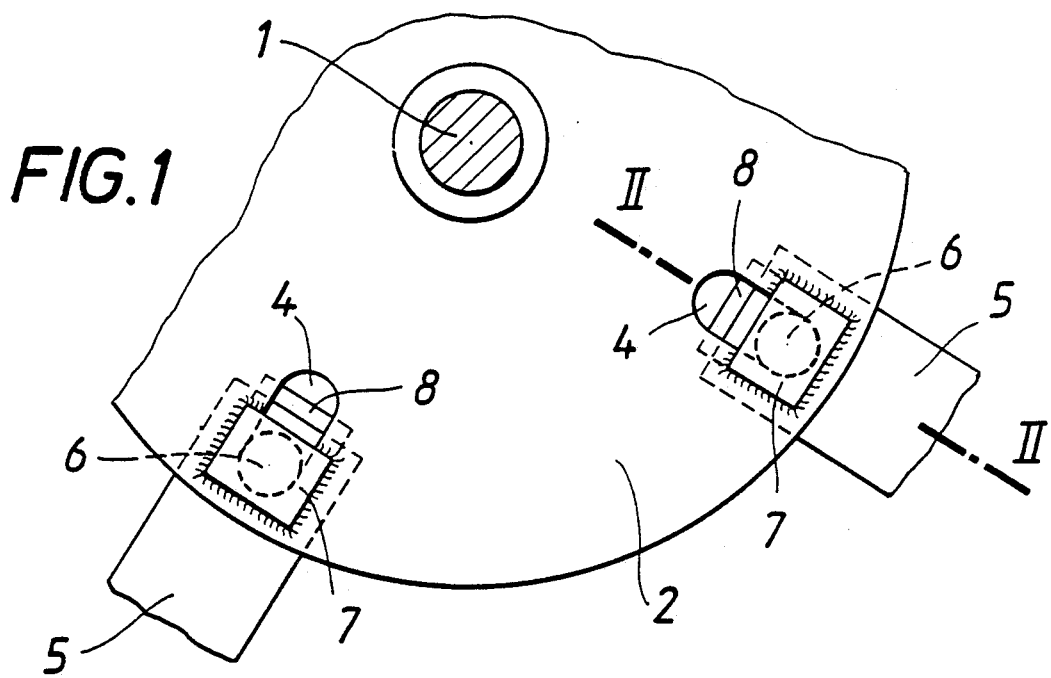
FIG. 1 is a top plan view showing a horizontal disk-shaped tool carrier and knives secured thereto.

Several illustrative embodiments of the invention will now be described more in detail with reference to the drawing.

Figure 2:
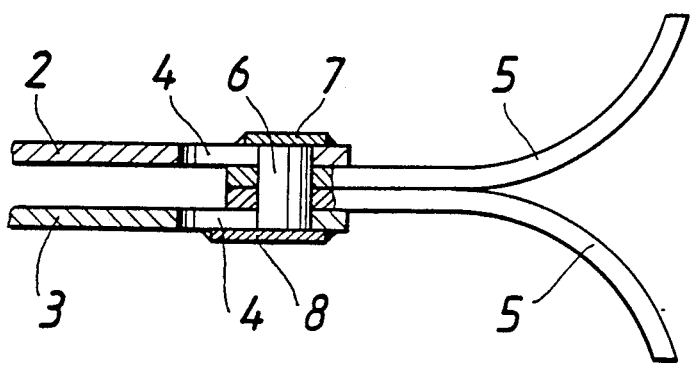
FIG. 2 is a vertical sectional view taken on line II—II in FIG. 1.

In the embodiment shown in FIGS. 1 and 2 a tool carrier consisting of two disks 2, 3 is secured to a driven vertical shaft 1. Each of the disks 2 and 3 is formed with circumferentially spaced apart slots 4, which extend radially with respect to the shaft 1 and register with the slots 4 in the other disk. Pins 6 are provided, each of which carries two tools 5 and the ends of which are movably mounted in two registering ones of the slots 4. The tools 5 may consist of knives and are freely pivotally movable on the pins. Each pin 6 is displaceable along the associated slots 4. The radially outer portions of the slots 4 in each disk are covered by a sheet metal element 7 or 8, which is welded to the outside surface of the associated disk 2 or 3. The elements 7 and 8 prevent an axial displacement of the pins 6 from the slots 4 when the pins are in their illustrated position under the action of centrifugal force during the rotation of the tool carrier 2, 3. The opening which is left uncovered by the lower cover 8 at the radially inner end of each slot 4 is smaller than the cross-section of the pin 6 so that the pin 6 cannot fall out downwardly when the knives 5 or other tools have been forced radially inwardly. But each pin 6 can be pushed out upwardly through the opening which has been left in the slot 4 of the bottom disk 3 so that the knives 5 or other tools can be removed and replaced. It will be understood that for an assembling of the knives 5 or other tools in the tool carrier the tools 5 are pushed in between the disks 2 and 3 to such an extent that the bores of the knives are aligned with the radially inner end portions of the slots so that the pins 6 can then be inserted from above.

Figure 3:
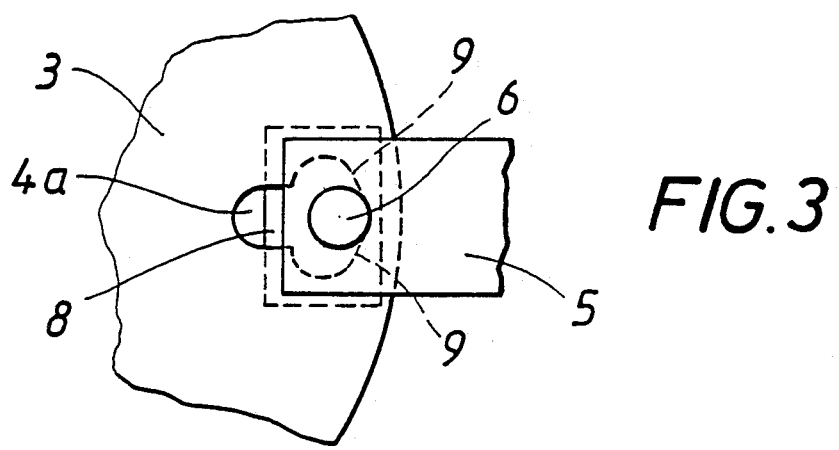
FIG. 3 is a top plan view showing a slot having a cardioid enlarged portion; the upper disk of the tool carrier has been removed.

In the embodiment shown in FIG. 3 the slot 4a is enlarged in approximately cardioid shape at its radially outer end owing to the provision of oblique side faces 9 flaring from the radially outer end of the slot. Owing to that design an impact of the tool 5 or of the pin 6 on a hard object will cause the pin 6 to yield along the oblique side faces 9 so that the action of the impact on the remaining parts of the machine will be alleviated.

Figure 4:
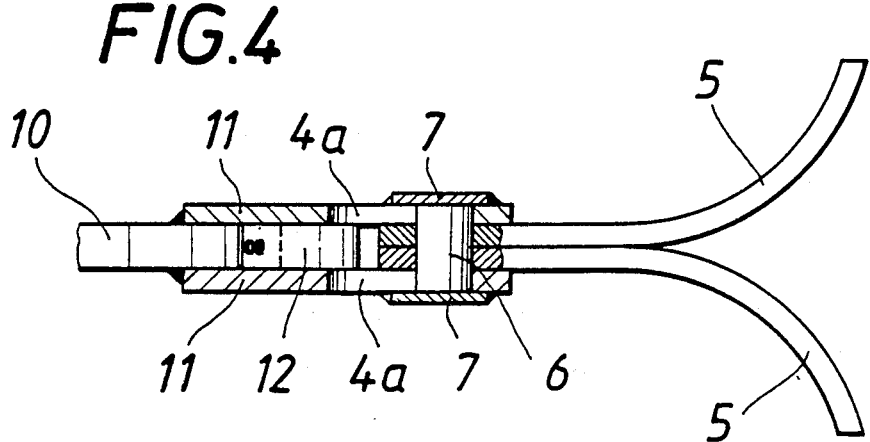
FIG. 4 is a fragmentary top plan view showing a portion of a tool carrier which is rotatable about a horizontal axis.
Figure 5:
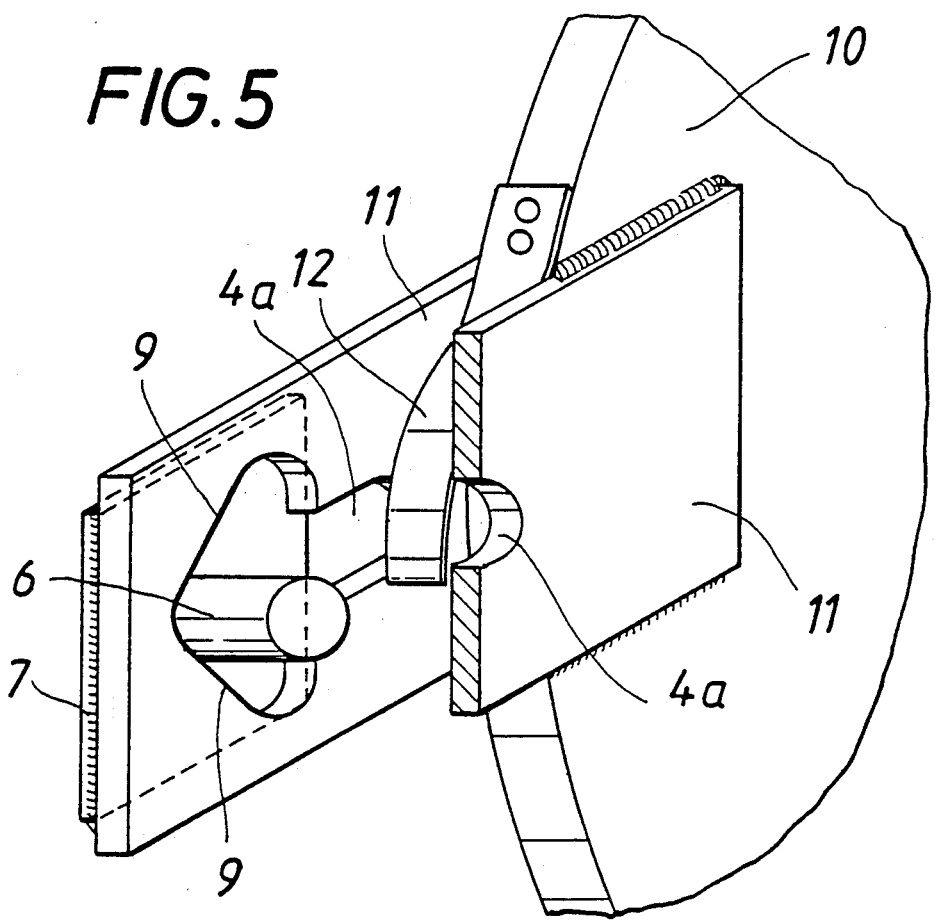
FIG. 5 is a perspective view showing the same portion as FIG. 4 without the tool.
Figure 6:
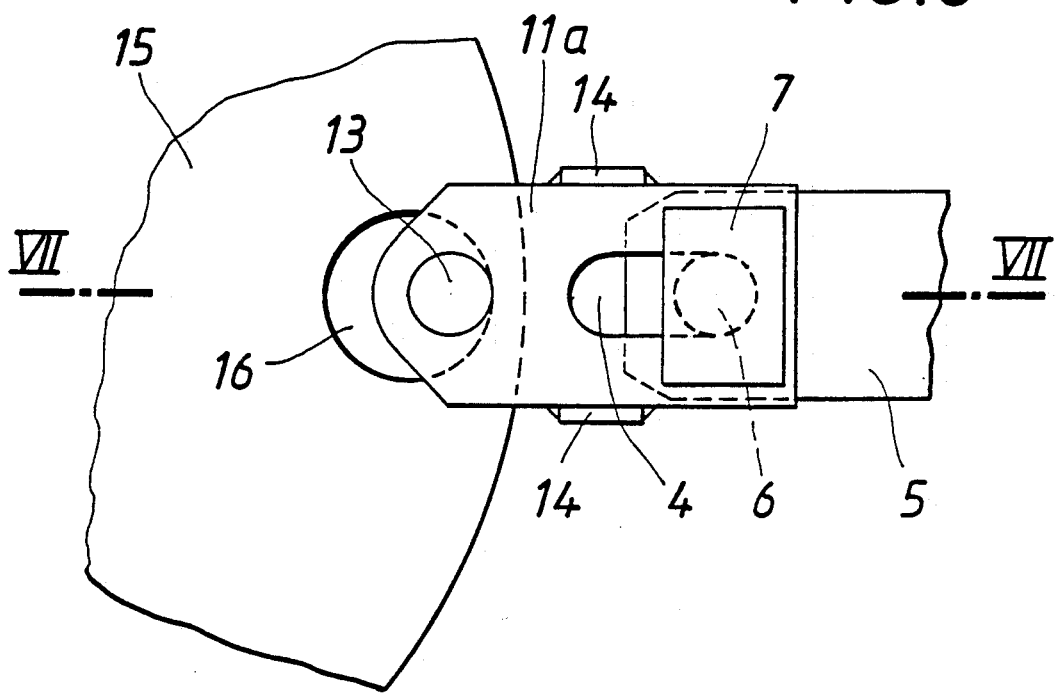
FIG. 6 is a top plan view showing an embodiment comprising a horizontal tool carrier.

In the embodiment shown in FIGS. 4 and 5 the tool carrier comprises a body disk 10, which is rotatable about a horizontal axis. A plurality of peripherally spaced apart pairs of mutually opposite lugs 11 are welded to and protrude radially from the disk 10 and are formed with the slots 4a, which are enlarged in cardioid shape at their radially outer ends and adapted to receive the pins 6 for mounting the tools 5. The disk 10 is provided on both outside surfaces with two coextensive sheet metal covers 7 covering the slots 4a on the outside of the lugs 11. In order to prevent an inadvertent lateral displacement of the pin 6 from the radially inner end of the slot 4a, a leaf spring 12 extends between the lugs 11 of each pair adjacent to the radially inner end portions of the slots 4a. For a removal of a tool 5, that leaf spring 12 can easily be forced radially inwardly to clear the slots 4a.

Figure 7:
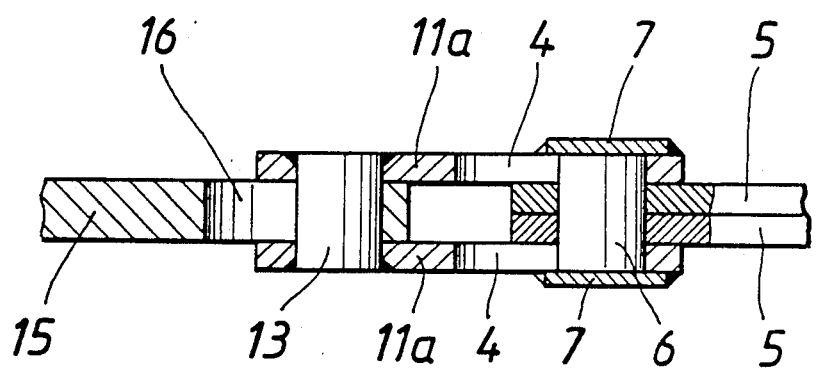
FIG. 7 is a sectional view taken on line VII—VII in FIG. 6.

In the embodiment shown in FIGS. 7 and 8, the lugs 11a of each pair are interconnected to form a lug unit by means of a pin 13, which is welded to the lugs, and by two side flanges 14. The tool carrier consists of a horizontal body disk 15, to which each lug unit 11a–11a is pivoted by means of the pin 13 about an axis which is substantially parallel to the axis of rotation of the disk 15. The pin 13 is mounted in an associated hole 16 of the tool carrier 15 with a radial play with respect to the axis of rotation and with a circumferential play. In that embodiment too the bottom sheet metal cover 7 need not cover the bottom slot 4 at its radially inner end because a displacement of each knife 5 in a radially inward direction will result in a displacement of the lugs 11a owing to the play of the pin 13 in the hole 16 and the tools 5 will engage the rim of the body disk 15 before the pin 6 strikes against the lugs 11a at the extreme end of the slots 4.

I claims:

1. In a machine for cutting vegetable material, comprising
    at least one tool carrier, which is mounted to be rotatable about an axis of rotation and has two mutually opposite broadside surfaces facing in the direction of said axis,
    a plurality of pins, which are mounted in said tool carrier and are circumferentially spaced apart and parallel to said axis of rotation, and
    a plurality of tools, which are pivoted to said tool carrier by said pins,
    the improvement residing in that
    at least one of said tools is mounted on each of said pins,
    said tool carrier is formed with circumferentially spaced apart pairs of slots, which register and are spaced apart in the direction of said axis and extend radially with respect to said axis and open in both said broadside surfaces and each of which has a radially inner end portion and a radially outer end portion,
    each of said pins has mutually opposite ends, which extend into and are movable along said slots of one of said pairs, and
    covering means are mounted on said tool carrier and cover said radially outer end portions of said slots on both said broadside surfaces to prevent an axial displacement of each of said pins when its ends are disposed in said radially outer end portions of one of said pairs of slots.

2. The improvement set forth in claim 1 as applied to a mowing machine.

3. The improvement set forth in claim 1 as applied to a chopping machine.

4. The improvement set forth in claim 1 as applied to a machine in which said tool carrier comprises two disks, which are spaced apart in the direction of said axis, wherein said slots of each of said pairs are formed in respective ones of said disks.

5. The improvement set forth in claim 1, wherein said tool carrier comprises a tool carrier body, which is mounted to be rotatable about said axis of rotation, and a plurality of circumferentially spaced apart pairs of lugs, which protrude substantially radially from said body and are spaced apart in the direction of said axis and formed with said broadside surfaces, and each of said lugs is formed with one of said slots.

6. The improvement set forth in claim 5, wherein the lugs of each of said pairs thereof are interconnected to form a lug unit and said lug unit is pivoted to said tool carrier on an axis which is substantially parallel to said axis of rotation and with a radial play with respect to said axis of rotation.

7. The improvement set forth in claim 6, wherein said lug unit is pivoted to said tool carrier with a circumferential play with respect to said axis of rotation.

8. The improvement set forth in claim 6, as applied to a machine in which said tool carrier comprises two disks, which are spaced apart in the direction of said axis, wherein said slots of each of said pairs are formed in respective ones of said disks.

9. The improvement set forth in claim 1 as applied to a machine in which said tool carrier is mounted to be rotatable about a vertical axis of rotation and has top and bottom broadside surfaces facing in the direction of said axis, wherein said covering means leave said radially inner end portion of each of said slots exposed on said bottom broadside in an area which is smaller than the cross-section of each of said pins.

10. The improvement set forth in claim 1, wherein each of said slots is defined at said radially outer end portion by oblique side faces so that said radially outer end portion is substantially cardioid-shaped.

11. The improvement set forth in claim 1 as applied to a machine in which said tool carrier is mounted to be rotatable about a horizontal axis of rotation, wherein a plurality of springs are mounted in said tool carrier and extend between said radially inner end portions of said slots of respective pairs thereof and each of said springs is adapted to be forced radially inwardly to clear said slots.

12. The improvement set forth in claim 11, as applied to a machine in which said tool carrier comprises two disks, which are spaced apart in the direction of said axis, wherein said slots of each of said pairs are formed in respective ones of said disks, and said springs extend between said two disks.

13. The improvement set forth in claim 11, wherein said tool carrier comprises a tool carrier body, which is mounted to be rotatable about said axis of rotation, and a plurality of circumferentially spaced apart pairs of lugs, which protrude substantially radially from said body and are spaced apart in the direction of said axis and formed with said broadside surfaces, each of said lugs is formed with one of said slots, and each of said springs extends between the lugs of one of said pairs of lugs.

* * * * *